(12) United States Patent
Huang et al.

(10) Patent No.: US 11,833,673 B2
(45) Date of Patent: Dec. 5, 2023

(54) ENERGY STORING ASSISTIVE MECHANISM, ROBOTIC JOINT AND ROBOT

(71) Applicant: UBTECH ROBOTICS CORP LTD, Shenzhen (CN)

(72) Inventors: Zhongkui Huang, Shenzhen (CN); Zheng Xie, Shenzhen (CN); Hongyu Ding, Shenzhen (CN); Qixiang Luo, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 212 days.

(21) Appl. No.: 17/499,890

(22) Filed: Oct. 13, 2021

(65) Prior Publication Data

US 2022/0134581 A1 May 5, 2022

Related U.S. Application Data

(63) Continuation of application No. PCT/CN2020/140558, filed on Dec. 29, 2020.

(30) Foreign Application Priority Data

Oct. 30, 2020 (CN) .......................... 202011196318.3

(51) Int. Cl.
*B25J 19/00* (2006.01)
*B25J 9/10* (2006.01)
*B25J 9/12* (2006.01)

(52) U.S. Cl.
CPC ........... *B25J 19/0016* (2013.01); *B25J 9/102* (2013.01); *B25J 9/108* (2013.01); *B25J 9/109* (2013.01); *B25J 9/123* (2013.01)

(58) Field of Classification Search
CPC ... B25J 9/102; B25J 9/108; B25J 9/109; B25J 9/123; B25J 19/0016
See application file for complete search history.

(56) References Cited

U.S. PATENT DOCUMENTS 5,295,408 A * 3/1994 Nagle ..................... F16C 1/262
74/501.5 R
9,545,728 B2 * 1/2017 Hasuo .................. B25J 19/0012

FOREIGN PATENT DOCUMENTS

| CN | 101583812 | * 11/2009 |
| CN | 104309717 A | 1/2015 |
| CN | 105235766 A | 1/2016 |

(Continued)

OTHER PUBLICATIONS

ISR for PCT/CN2020/140558.
Written opinions of ISA for PCT/CN2020/140558.

*Primary Examiner* — William C Joyce

(57) ABSTRACT

An energy storing assistive mechanism includes a barrel having a first pivot end and an open end, a rod having a first end that passes through the open end and is received in the barrel, an elastic structure including two ends that abut against the first end of the rod and the first pivot end, a uni-directional gear rack having a second pivot end away from the barrel, and a locking mechanism fixed to the rod, the locking mechanism comprising a locking member and an actuator assembly that is to drive the locking member to move between a first position where the locking member is engaged with the gear rack, and a second position where the locking member is disengaged from the gear rack.

16 Claims, 8 Drawing Sheets

(56) References Cited

FOREIGN PATENT DOCUMENTS

| CN | 205064671 | * | 3/2016 |
| CN | 105840706 | * | 8/2016 |
| CN | 207111827 | * | 3/2018 |
| CN | 111743736 A | | 10/2020 |

* cited by examiner

ENERGY STORING ASSISTIVE MECHANISM, ROBOTIC JOINT AND ROBOT

CROSS REFERENCE TO RELATED APPLICATIONS

The present application is a continuation-application of International Application PCT/CN2020/140558, with an international filing date of Dec. 29, 2020, which claims foreign priority of Chinese Patent Application No. 202011196318.3, filed on Oct. 30, 2020 in the China National Intellectual Property Administration, the contents of all of which are hereby incorporated by reference.

BACKGROUND

1. Technical Field

The present disclosure generally relates to robots, and particularly to an energy storing assistive mechanism and robot having the same.

2. Description of Related Art

Some conventional robot joint structures have two problems in the movement process: In certain motion scenarios, greater speed and acceleration are required, and the required output power of rotating actuators needs to be increased accordingly, which will increase the overall weight and size of the joint structures, as well as production cost; At certain locations, the gravitational potential energy of the robot joint structures cannot be stored, and it needs the rotating actuators to do work to overcome gravity, which causes energy loss.

Therefore, there is a need to provide an energy storing assistive mechanism and a robot to overcome above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
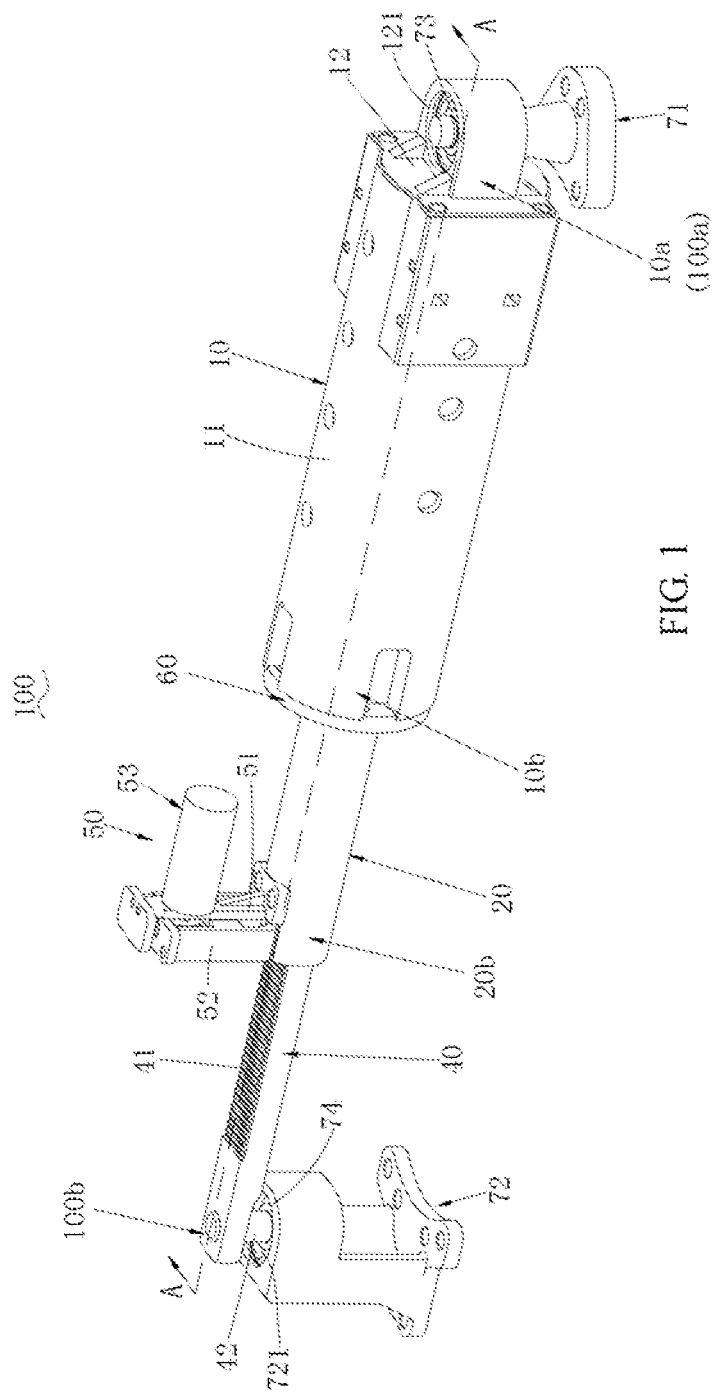
FIG. 1 is a schematic isometric view of an energy storing assistive mechanism according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
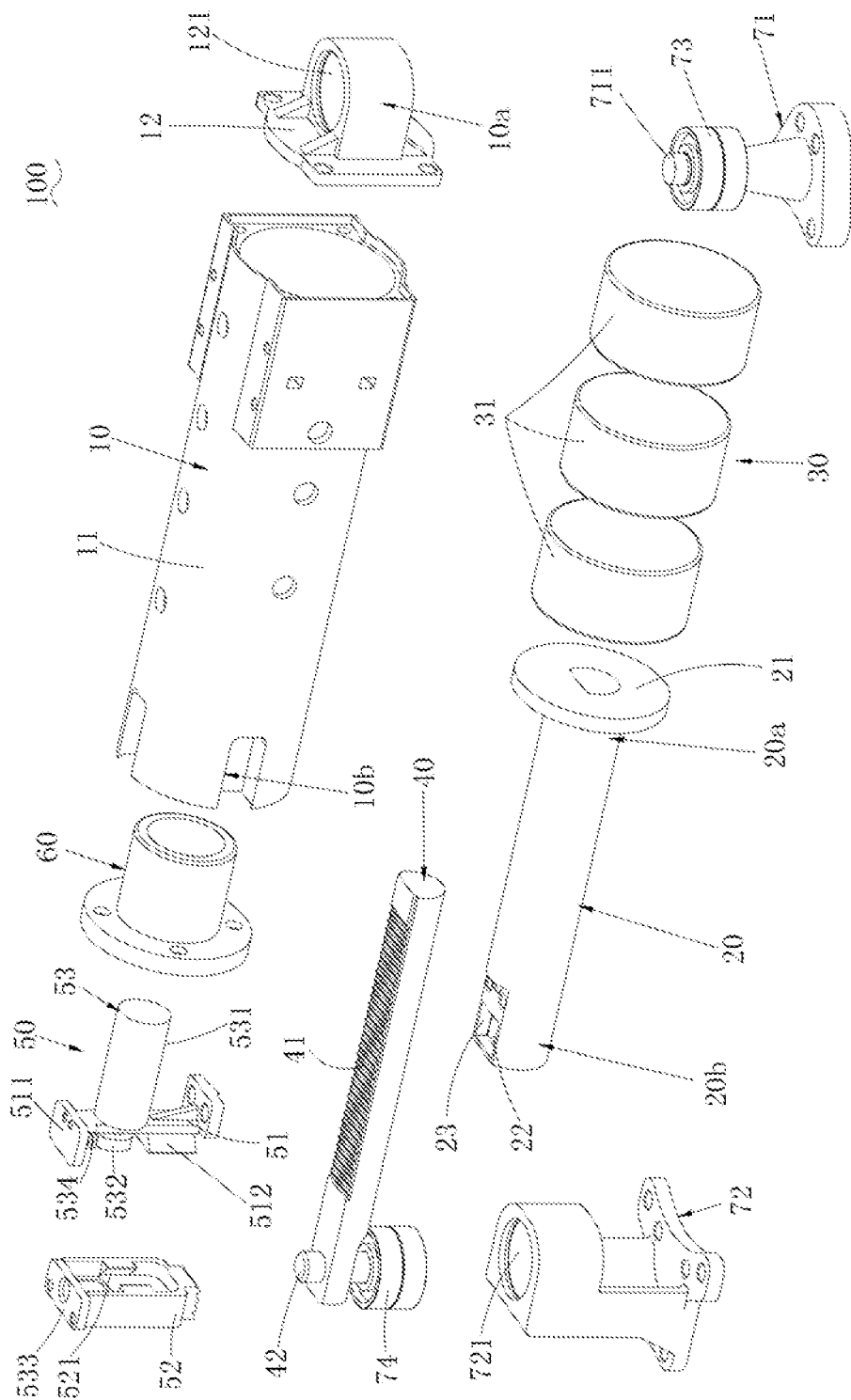
FIG. 2 is an isometric exploded view of the assistive mechanism.
Figure 3:
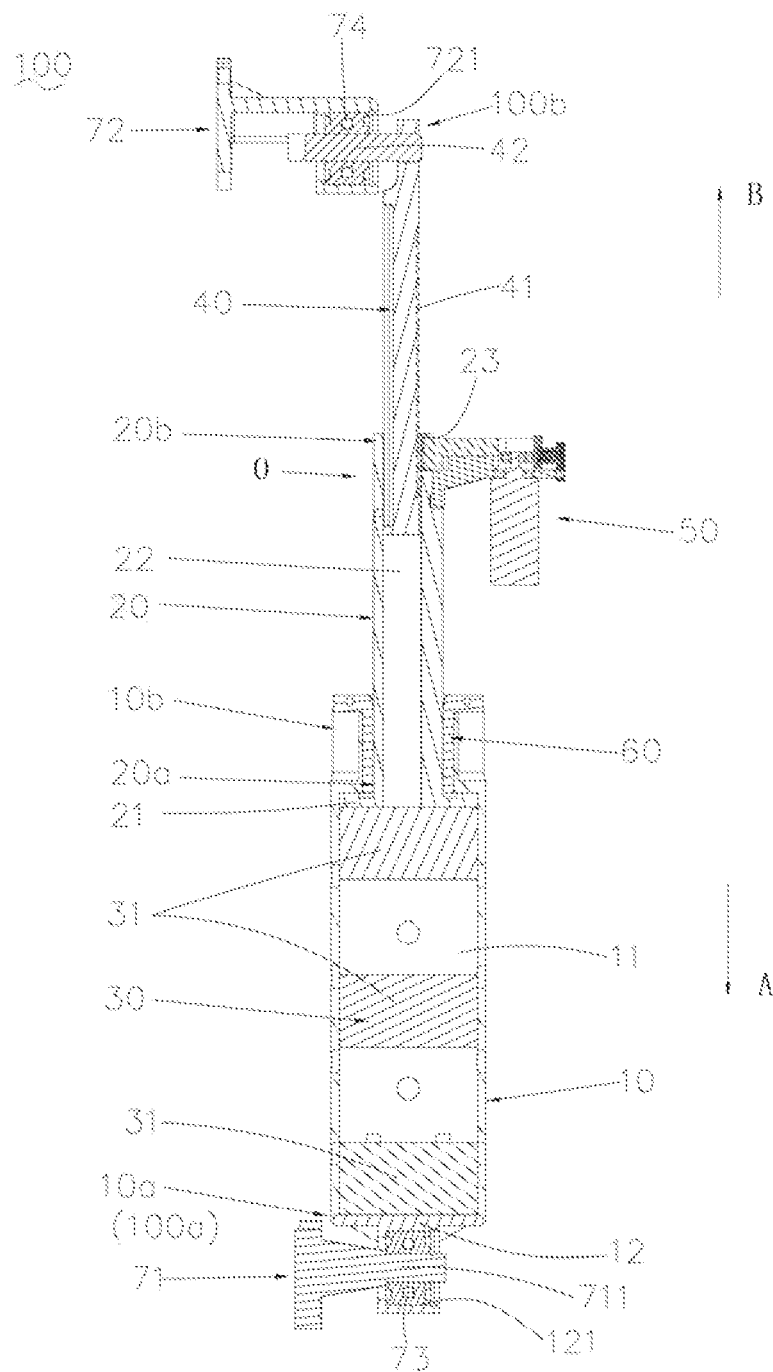
FIG. 3 is a cross-sectional view of the assistive mechanism along lines A-A in FIG. 1.

FIGS. 1 and 2 show an energy storing assistive mechanism 100 according to one embodiment. The assistive mechanism 100 may be applied to different joint structures of robots, such as knee joints, elbow joints, etc., and is arranged in parallel at opposite ends of various hinge joints to provide energy storage and release for corresponding joints. In one embodiment, the assistive mechanism 100 may include a barrel 10, a rod 20, an elastic structure 30, a uni-directional gear rack 40, and a locking mechanism 50. The first end 10a of the barrel 10 serves as a first pivot end 100a, and the second end 10b of the barrel 10 is an open end. Referring to FIG. 3, the rod 20 has a first end 20a that passes through the open end and is received in the barrel 10. The rod 20 is slidable with respect to the barrel 10 along a lengthwise direction of the barrel 10. The elastic structure 30 has two ends that respectively abut against the first end 20a of the rod 20 and the inner surface of the first end 10a of the barrel 10. The uni-directional gear rack 40 has a second pivot end 100b away from the barrel 10. The locking mechanism 50 is fixed to the rod 20, and includes a locking member 52 and an actuator assembly 53 that drives the locking member 52 to move between a first position (see FIG. 7) where the locking member 52 is engaged with the gear rack 40, and a second position (see FIG. 6) where the locking member 52 is disengaged from the gear rack 40. The gear rack 40 is freely slidable with respect to the rod 20 when the locking member 52 is in the second position, and the gear rack 40 is securely connected to the rod 20 when the locking member 52 is in the first position. When the gear rack 40 receives an external force that can drive the gear rack 40 to move away from the barrel 10, the locking member 52 is able to change from being engaged with the gear rack 40 to being disengaged from the gear rack 40.

Figure 8:
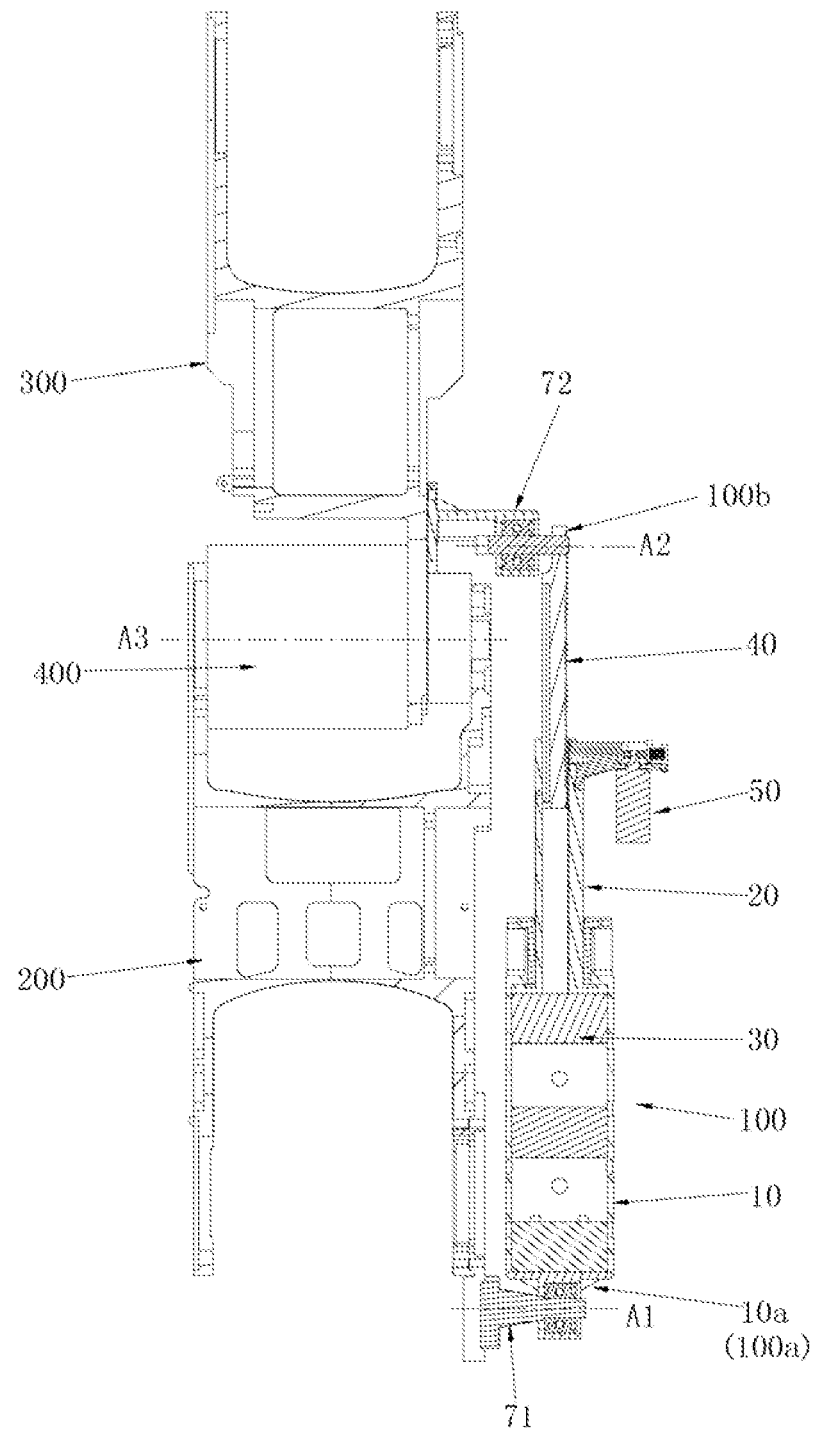
FIG. 8 is an isometric view of a robotic joint structure according to one embodiment.

The first pivotal end 100a and the second pivotal end 100b are rotatably connected to two ends of a hinge joint, such as a hinge joint shown in FIG. 8. The hinge joint may include a first link 200, a second link 300 rotatably connected to the first link 200, and an actuating member 400 that drives the second link 300 to rotate with respect to the first link 200. The first pivot end 100a is connected to the first link 200, and the second pivot end 100b is connected to the second link 300. When the position of the center of gravity of the second link 300 is higher than the position of the center of gravity of the first link 200, the second link 300 has a certain gravitational potential energy. Therefore, the gear rack 40 can receive the mechanical power of the actuating member 400 or the gravitational potential energy of the second link 300 connected to the gear rack 40, which is converted into kinetic energy.

With such configuration, when the joint needs energy storage, the gear rack 40 is switched to a fixed state, in which the gear rack 40 is securely connected to the rod 20. The gear rack 40 receives the mechanical power of the actuating member 400 or the gravitational potential energy of the second link 300 connected to the gear rack 40, which is converted into kinetic energy. Specifically, when the rod 20 moves down together with the gear rack 40 in a direction indicated by an arrow A in FIG. 3, the elastic structure 30 is compressed, which converts the kinetic energy of the rod 20 into the potential energy of the elastic structure 30, thereby realizing energy storage. When the rod 20 moves up together with the gear rack 40 in a direction indicated by an arrow B in FIG. 3, the elastic structure 30 applies a restoring force to the rod 20, thereby aping an assistive pushing force to the second link 300. After the energy release of the elastic structure 30 is completed, the elastic structure 30 returns to its original form. The uni-directional gear rack 40 can then be switched to a free state in which the locking member 52 is disengaged from the gear rack 40. The gear rack 40 can move with respect to the rod 20 so as to continue moving together with the second link 300. After the elastic structure 30 returns to its original form, it does not store energy. The assistive mechanism 100 can realize energy storage and release by timely controlling the gear rack 40 to be connected to or disconnected from the rod 20, which enables mechanical energy to be stored on the elastic structure 30 when energy storage is needed, and releases energy when energy is needed, thereby saving energy and providing additional assistive mechanical power to the second link 300. The assistive mechanism 100 has a compact structure and a limited size, can store a large amount of energy in a limited space, and can provide a large torque within a limited angle.

Referring to FIG. 8, the axis of rotation A1 of the first pivot end 100a, the axis of rotation A2 of the second pivot end 100b, and the pivot axis A3 between the second link 300 and the first link 200 are parallel to one another. That is, the assistive mechanism 100 is connected in parallel to opposite ends of the joint structure. Since the distance between two adjacent teeth of the gear rack 40 and locking member 52 is relatively small, the actuator assembly 53 can drive the locking member 52 to move at any time when energy storage is required, such that the locking member 52 can be engaged with the gear rack 40. That is, the gear rack 40 is switched to the fixed state.

In one embodiment, as shown in FIGS. 1 and 2, the barrel 10 may include a cylindrical body 11 and an end cap 12. The cylindrical body 11 has two opposite open ends, and the end cap 12 is arranged at one of the open ends. This structure facilitates the assembly of the elastic structure 30 and the rod 20 to the barrel 10.

Figure 4:
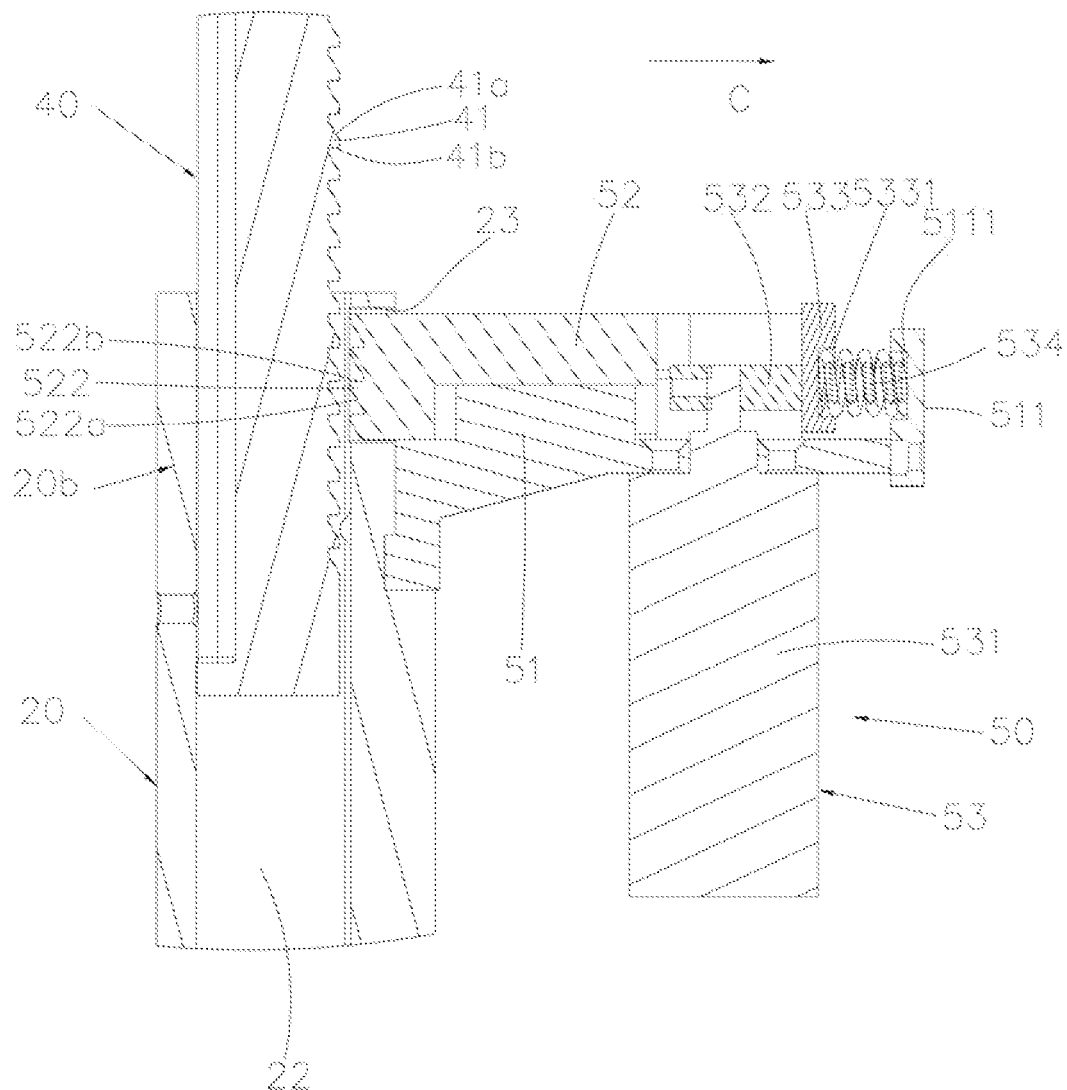
FIG. 4 is an enlarged view of portion B in FIG. 3.

Referring to FIGS. 3 and 4, in one embodiment, the uni-directional gear rack 40 includes a number of first wedge-shaped teeth 41. Each of the first wedge-shaped teeth 41 includes a first inclined surface 41a and a first vertical surface 41b opposite to each other. The first vertical surface 41b is disposed facing the first pivot end 100a, and the first inclined surface 41a is disposed facing the second pivot end 100b. The locking member 52 includes a plurality of second wedge-shaped teeth 522. Each of the second wedge-shaped teeth 522 includes a second inclined surface 522a and a second vertical surface 522b opposite to each other. The second inclined surface 522a is disposed facing the first pivot end 100a, and the second vertical surface 522b is disposed facing the second pivot end 100b. When the locking member 52 is engaged with the uni-directional gear rack 40, the second inclined surfaces 522a abut against corresponding ones of the first inclined surfaces 41a, and the second vertical surfaces 522b abut against corresponding ones of the first vertical surfaces 41b. The gear rack 40 and the locking member 52 can achieve two-way locking when they move within a certain range. When the gear rack 40 is engaged with the locking member 52 and the elastic structure 30 is in the process of releasing energy, the gear rack 40 extends out of the open end of the rod 20. After the elastic structure 30 returns to its original form and stops releasing energy, and the rod 20 is restricted by the barrel 10 and cannot continue moving up with respect to the barrel. At this time, if the second link continues driving the gear rack 40 to move, the locking member 52 will move away from the gear rack 40 in a direction indicated by the arrow C in FIG. 4 due to the engagement of the second inclined surfaces 522a with corresponding first inclined surfaces 41a. In this way, the locking member 52 can disengage from the gear rack 40.

Referring to FIGS. 2 and 3, in one embodiment, the elastic structure 30 is a magnetic spring that includes at least two magnets 31 slidably received in the barrel 10. Each two adjacent ones of the at least two magnets 31 have like poles that face each other. Thus, two adjacent magnets 31 repel each other. When the gear rack 40 is in the free state, the magnets 31 are spaced one another. Specifically, one of the magnets 31 is in contact with the end surface of the first end 20a of the rod 20 under the action of magnetic force, and another magnet 31 is in contact with the inner surface of the first end 10a of the barrel 10 under the action of magnetic force. Magnetic potential energy is stored when the distance between two adjacent magnets 31 decreases, and magnetic potential energy is released when the distance between two adjacent magnets 31 increases. When the gear rack 40 is switched to the fixed state in which the gear rack 40 is securely connected to the rod 20, the force from the second link 300 can be transmitted from the gear rack 40 to the rod 20. When the rod 20 moves down in the direction indicated by the arrow A in FIG. 3, the uppermost magnet 31 in contact with the rod 20 is pushed by the rod to move down, and the interaction force between adjacent magnets 31 is increased, which realize energy storage. When the rod 20 moves up, the stored energy will be released, which causes one or more magnets 31 to move up and apply a pushing force to the rod 20. After the rod 20 stops moving up due to the restriction from the barrel 10, one or more magnets 31 return to their initial positions. At this time, the magnetic spring does not store or release energy.

In order to determine the relationship between the magnetic force of the magnetic spring and the distance between the magnets, the magnetic force can be measured when the magnets are arranged at different positions. By performing conventional linear fitting on the measurement data of the magnetic spring, the magnetic force of the magnetic spring can be determined according to the following equation: $F=a*e^{-ex}+b*e^{-dx}$, where F represents the magnetic force of the magnetic spring, x represents the distance between two adjacent magnets, a, b, c, d are undetermined coefficients, which can be determined by linear fitting.

It can be known from the equation above that the magnetic force of the magnetic spring changes roughly exponentially. The magnetic force of the magnetic spring is in inverse proportion to the distance between adjacent magnets 31. The embodiment above adopts a form in which multiple magnets 31 are distributed along a straight line and the magnetic forces of two adjacent magnets 31 are mutually repulsive, that is, the magnets 31 are arranged in series. Increasing the number of magnets 31 in series can increase the stiffness of the magnetic spring. Within a certain spatial movement range, by increasing the number of magnets 31 in series, the energy storage density of the magnetic spring can be increased, thereby increasing the explosive power.

In addition, the inner lateral surface the barrel 10 can be made to adapt to the magnets 31, which facilitates the movement of the magnets 31 along the lengthwise direction of the barrel 10. In one embodiment, the inner lateral surface of the barrel 10 is cylindrical, and the magnets 31 are cylindrical, which facilitates the sliding movement of the magnets 31 in the barrel 10 along the lengthwise direction of the barrel 10.

In an alternative embodiment, the elastic structure may be a coil spring. Opposite ends of the coil spring are respectively abutted against the end surface of the first end of the rod and the inner surface of the first end of the barrel. When the gear rack 40 is switched to the fixed state in which the gear rack 40 is securely connected to the rod 20, the force from the second link 300 can be transmitted from the gear rack 40 to the rod 20. When the rod 20 moves down, it can compress the coil spring, which can convert the kinetic energy of the rod 20 into the elastic potential energy of the coil spring. When the rod 20 moves up, the compressed spring can release energy.

Referring to FIGS. 2 and 3, in one embodiment, the rod 20 may include a flange 21 at the end 20*a*. The flange 21 can abut against an inner surface adjacent to the open end 10*b* of the barrel 10 to prevent the rod from disengaging from the barrel 10.

Referring to FIGS. 2 and 3, in one embodiment, a linear bearing 60 is arranged at the open end 10*b* of the barrel 10. The linear bearing 60 is used to support the rod 20. In this way, the rod 20 can be prevented from directly contacting the inner surface of the barrel 10, and the rod 20 can slide smoothly and stably with respect to the open end 10*b* of the barrel 10. The linear bearing 60 can be a graphite bearing, which have strong wear resistance and good lubricity.

Referring to FIGS. 1, 2, and 4, in one embodiment, the locking mechanism 50 may further include a base 51 that is fixed to the rod 20, and the locking member 52 is slidably connected to the base 51. The locking member 52 is thus connected to the rod 20 and can move together with the rod 20. The locking member 52 is slidable with respect to the base 51 to different positions so as to engage with or disengage from the gear rack 40. As shown in FIG. 4, in one embodiment, the base 51 may be fixed to the second end 20*b* of the rod 20, by fasteners or other conventional connection means.

Figure 5:
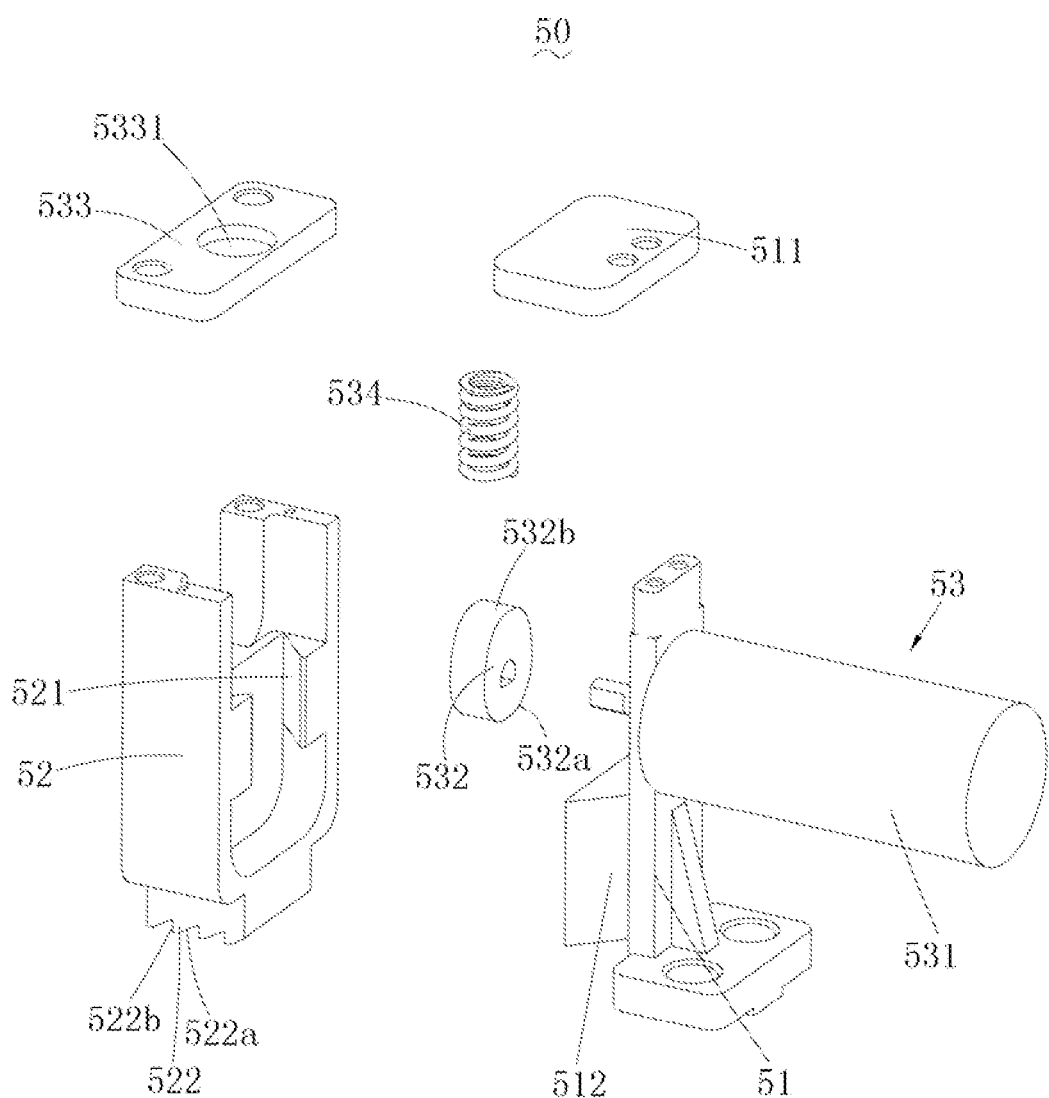
FIG. 5 is an isometric exploded view of a locking mechanism of the assistive mechanism.
Figure 6:
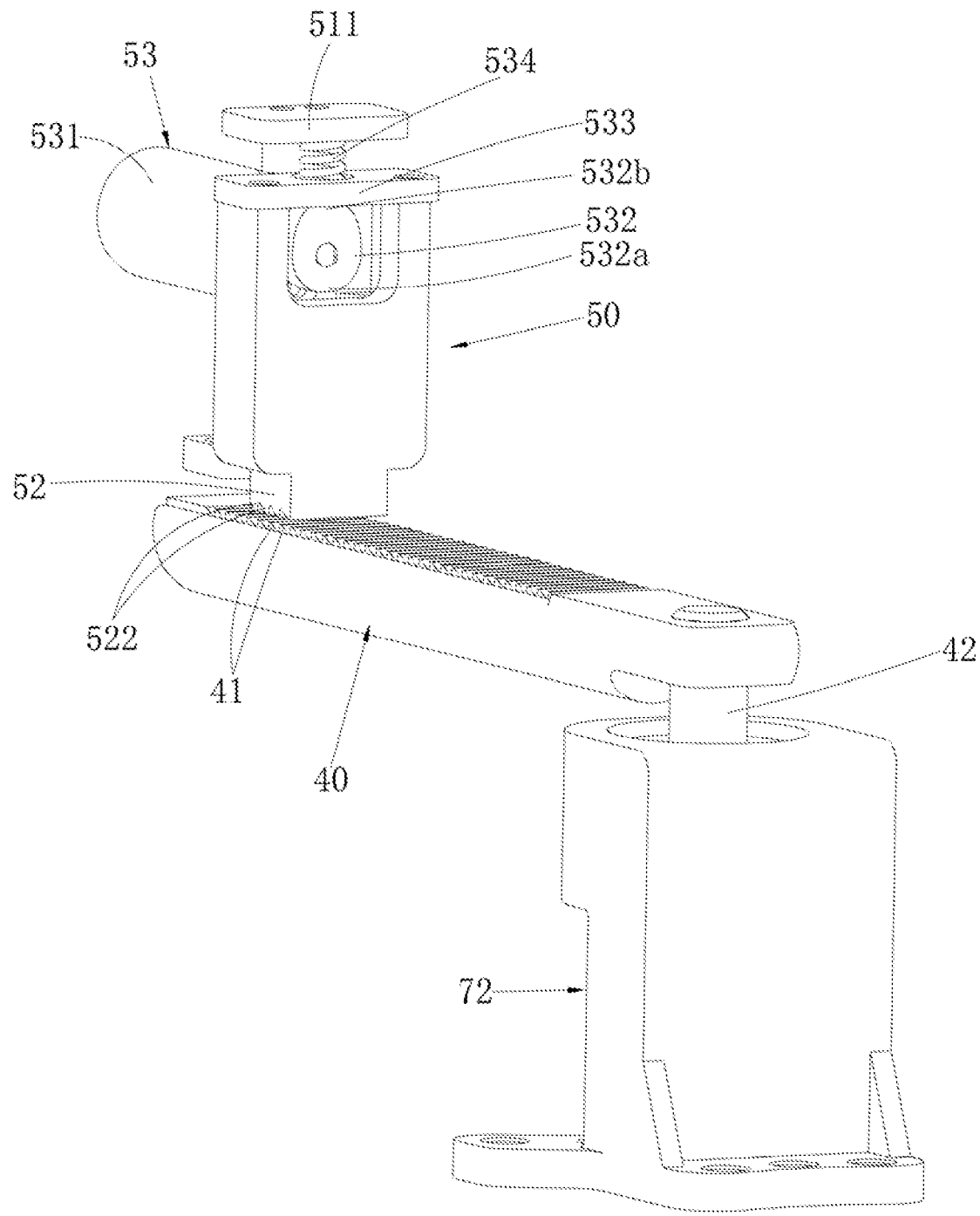
FIG. 6 shows a gear rack of the assistive mechanism in a free state.
Figure 7:
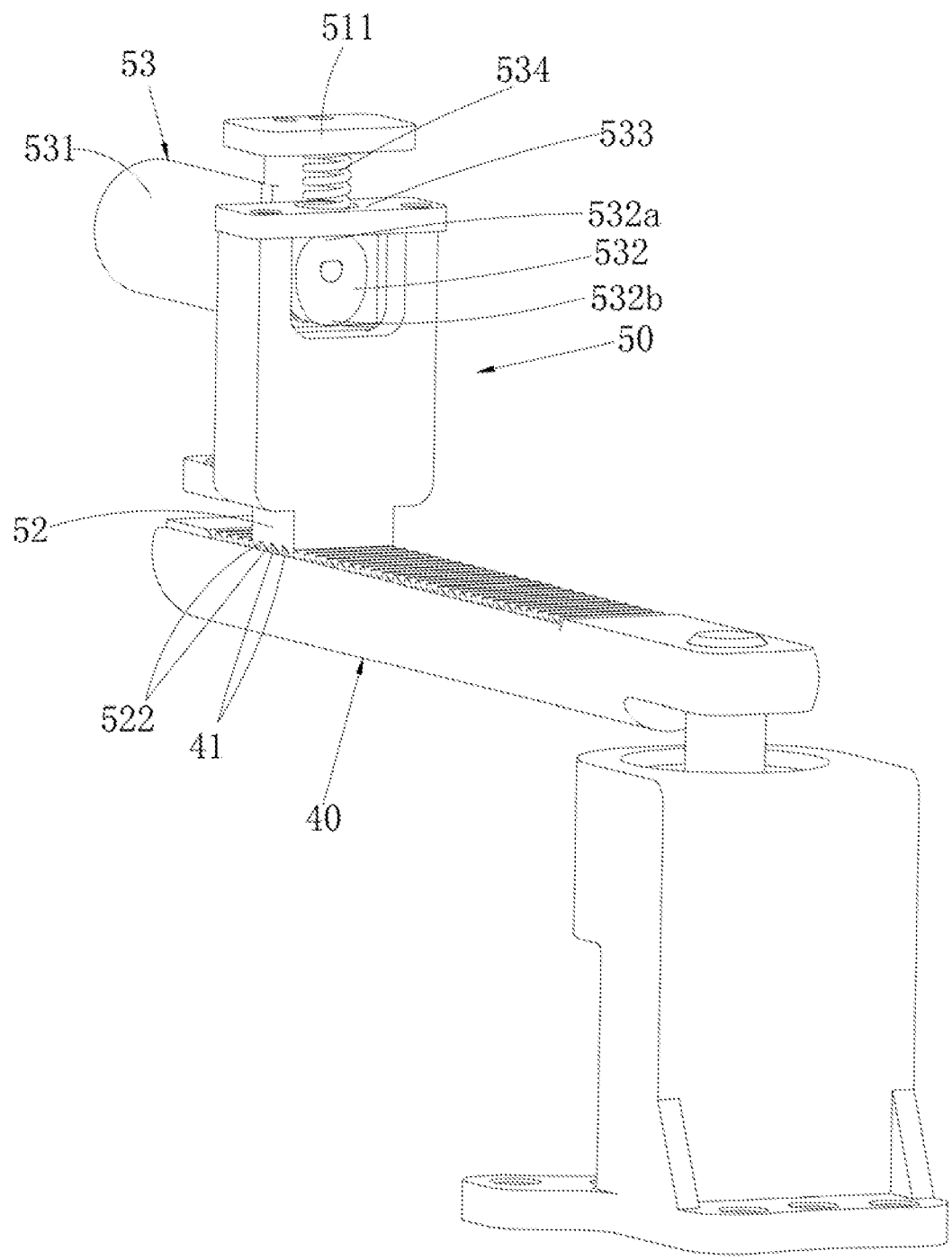
FIG. 7 shows the gear rack of the assistive mechanism in a fixed state.

Referring to FIGS. 4-6, in one embodiment, a limiting plate 511 is fixed to the base 51. The actuator assembly 53 may include a rotating actuator 531, a cam 532 driven by the rotating actuator 531, a movable plate 533 fixed to the locking member 52 and staying in contact with the cam 532, and an elastic member 534 that is arranged between the limiting plate 511 and the movable plate 533. The cam 532 may be an oval or an imperfect circle or an eclipse. In one embodiment, the cam 532 may include a first end 532*a* and a second end 532*b*. The cam 532 has a profile of varying radius. The radius between the first end 532*a* and the center of rotation of the cam 532 is substantially the smallest, and the radius between the second end 532*b* and the center of rotation of the cam 532 is the largest. The elastic member 534 applies a pushing force to the movable plate 533 such that the movable plate 533 can always stay in contact with the lateral surface of the cam 532. The movable plate 533 is fixed to the locking member 52. The pushing force from the elastic member 534 can be transmitted to the locking member 52 via the movable plate 533 such that the locking member 52 can move toward the gear rack 40 to the first position. The cam can drive the movable plate 533 to move away from the uni-directional gear rack 40. Specifically, referring to FIG. 6, when the cam 532 rotates and the second end 532*b* gradually approaches the movable plate 533, the locking member 52 moves together with the movable plate 533 away from the gear rack 40, which further compresses the elastic member 534. The locking member 52 can thus move from the first position to the second position where the locking member 52 is disengaged from the gear rack 40. Referring to FIG. 7, when the cam 532 rotates and the first end 532*a* gradually approaches the movable plate 533, the elastic member 533 pushes the movable plate 533 toward the uni-directional gear rack 40 such that the locking member 52 can move toward the gear rack 40 to the first position where the locking member 52 is engaged with the gear rack 40.

In one embodiment, the rotating actuator 531 can be a rotating motor to rotate the cam 532. The rotating actuator 531 can be fixed tot the base 51. The elastic member 534 can be a coil spring. Referring to FIGS. 4 and 5, in one embodiment, the limiting plate 511 defines a cavity 5111 and the movable plate 533 defines a cavity 5331. Opposite ends of the elastic member 534 are received in the two cavities. After the energy release of the elastic structure 30 is completed, the elastic structure 30 returns to its original form, and the rotating actuator 531 can be actuated to drive the locking member 52 to move away from the gear rack 40 such that the locking member 52 can disengage from the gear rack 40.

In an alternative embodiment, the actuator assembly 53 may include a linear actuator that is to drive the locking member 52 to move toward and away from the uni-directional gear rack 40 such that the locking member 52 can move to the first position and the second position. The linear actuator can be an electric cylinder, and can be fixed tot the base 51. After the energy release of the elastic structure 30 is completed, the elastic structure 30 returns to its original form, and the linear actuator can be actuated to drive the locking member 52 to move away from the gear rack 40 such that the locking member 52 can disengage from the gear rack 40. In one embodiment, the actuator assembly 53 may further include an elastic member having opposite ends that are fixed to the output shaft of the linear actuator and the locking member.

Referring to FIG. 5, in one embodiment, a slidable limiting member 512 is fixed to the base 51. The locking member 52 defines a receiving chamber 521. The slidable limiting member 512 is shaped according to the receiving chamber 521. The slidable limiting member 512 is slidably received in the receiving chamber 521 and can guide the locking member 52 to slide with respect to the base 51. In this way, the locking member 52 is slidably connected to the base 51, which can reduce the possibility of the locking member 52 detaching from the base 51 during the movement, and improve the reliability of the mechanism. In one embodiment, the receiving chamber 521 can be a dovetail groove and the cross section of the slidable limiting member 512 is dovetail shaped, which allows the slidable limiting member 512 to be slidably received in the receiving chamber 521. However, the shape and configuration of the receiving chamber 521 and the slidable limiting member 512 are not limited, and can change according to actual needs.

Referring to FIGS. 3 and 4, in one embodiment, the rod 20 defines a receiving hole 22 extending along lengthwise direction thereof, and the uni-directional gear rack 40 is partly received in the receiving hole 22. One end of the gear rack 40 extends into the receiving hole 22, and can move along the lengthwise direction of the receiving hole 22. In one embodiment, the receiving hole 22 can be a non-circular shaped hole, such as a D-shaped hole. The gear rack 40 has a cross section shaped and sized according to the receiving hole 22, such that the gear rack 40 can move along the lengthwise direction of the receiving hole 22, but cannot rotate with respect to the rod 20.

Referring to FIGS. 2-4, in one embodiment, the rod 20 defines a through hole 23 in an outer surface thereof. The through hole 23 is in communication with the receiving hole 22, and one end of the locking member 52 is received in the through hole 23. The through hole 23 can guide the locking member 52 such that the locking member 52 can move in a direction substantially perpendicular to the gear rack 40.

Referring to FIGS. 1-3, in one embodiment, the assistive mechanism 100 may further include a first base 71 and a second base 72 that are arranged apart from each other. The first pivot end 10a of the barrel 10 is rotatably connected to the first base 71, and the second pivot end 100b of the gear rack 40 is rotatably connected to the second base 72. The first base 71 and the second base 72 can be fixed to opposite ends of a hinge joint, thereby connecting the assistive mechanism 100 to opposite ends of the hinge joint in parallel. The first base 71 and the second base 72 can be designed in different configuration according to the structure of the joint, and can be fixed on the joint by fasteners. In an example shown in FIG. 8, when the gear rack 40 is switched in the fixed state and the second link 300 rotates with respect to the first link 200, the second base 72 rotates together with the second link 300, which drives the gear rack 40 and the rod 20 to move. The rod 20 then compresses the elastic structure 30, which converts the kinetic energy of the rod 20 into the potential energy of the elastic structure 30. When the second link 300 rotates to its limit position, the potential energy storage of the elastic structure 30 reaches the maximum value. After that, if the second link 300 rotates in the reverse direction, the gear rack 40 will move up and the compressed elastic structure 30 applies a pushing force to the gear rack 40, which can provide explosive power to the joint.

Referring to FIGS. 2 and 3, in one embodiment, the assistive mechanism 100 may further include a first bearing 73 rotatably connecting the first pivot end 10a of the barrel 10 to the first base 71, and a second bearing 74 rotatably connecting the second pivot end 100b of the gear rack 40 to the second base 72. Bearings can reduce the friction between structural parts and improve the working reliability of the mechanism.

In one embodiment, the first base 71 includes a first post 711, and an end cap 12 is fixed to the first end 10a of the barrel 10. The end cap 12 defines a receiving chamber 121. The outer ring of the first bearing 73 is fitted in the receiving chamber 121, and the first post 711 is inserted into the inner ring of the first bearing 73, which rotatably connects the end cap 12 to the post 711. The barrel 10 can thus rotate with respect to the first base 71.

In one embodiment, the second base 72 defines a receiving chamber 721, and a post 42 is fixed to one end of the gear rack 40 away from the rod 20. The outer ring of the second bearing 74 is fitted in the receiving chamber 721, and the post 42 is inserted into the inner ring of the second bearing 74. The gear rack 40 can thus rotate with respect to the second base 72.

FIG. 8 shows a robotic joint structure according to one embodiment. The joint structure may include the assistive mechanism 100, the first link 200, the second link 300 rotatably connected to the first link 200, and the actuating member 400 that drives the second link 300 to rotate with respect to the first link 200. The actuating member 400 is fixed to the first link 2000. The first pivot end 100a of the assistive mechanism 100 is connected to the first link 200, and the second pivot end 100b is connected to the second link 300. The actuating member 400 may be a servo.

Since the robotic joint structure adopts all the technical solutions of all the above-mentioned embodiments, it also has all the beneficial effects brought by the technical solutions, which will not be repeated here.

In one embodiment, the robotic joint structure is a knee joint, with the first link 200 serving as an upper leg, and the second link 300 serving as a lower leg. If it needs to provide explosive power during a movement, such as a jumping action, energy storage should be carried out during the bending phase of the lower leg relative to the upper leg. During the rotational movement of the lower leg relative to the upper leg, the gear rack 40 is switched to the fixed state, allowing the second pivot end 100b to rotate together with the lower leg, which drives the gear rack 40 and the rod 20 to move. The rod 20 then compresses the elastic structure 30, which converts the kinetic energy of the rod 20 into the potential energy of the elastic structure 30. When the lower leg rotates to its limit position, the potential energy storage of the elastic structure 30 reaches the maximum value. After that, if the lower leg rotates in the reverse direction, the gear rack 40 will move up and the compressed elastic structure 30 applies a pushing force to the gear rack 40, which can provide explosive power to the knee joint.

In one embodiment as shown in FIG. 8, a robot includes the assistive mechanism 100 described in the embodiments above. Since the robot adopts all the technical solutions of all the above-mentioned embodiments, it also has all the beneficial effects brought by the technical solutions, which will not be repeated here.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. An energy storing assistive mechanism for a joint of a robot, comprising:
    a barrel comprising a first pivot end and an opposite open end;
    a rod comprising a first end that passes through the open end and is received in the barrel, the rod slidable with respect to the barrel along a lengthwise direction of the barrel;
    an elastic structure comprising two ends that respectively abut against the first end of the rod and the first pivot end of the barrel;
    a gear rack comprising a second pivot end away from the barrel;
    a locking mechanism fixed to the rod, the locking mechanism comprising a locking member and an actuator assembly that is configured to drive the locking member to move between a first position where the locking member is engaged with the gear rack, and a second position where the locking member is disengaged from the gear rack, wherein the gear rack is freely slidable with respect to the rod when the locking member is in the second position, and the gear rack is securely connected to the rod when the locking member is in the first position; and
    a limiting plate fixed to the base;
    wherein the locking mechanism further comprises a base that is fixed to the rod, and the locking member is slidably connected to the base;

wherein the actuator assembly comprises a rotating actuator, a cam driven by the rotating actuator, a movable plate fixed to the locking member and staying in contact with the cam, and an elastic member that is arranged between the limiting plate and the movable plate, the elastic member is configured to apply a pushing force to the movable plate so as to move the movable plate toward the near rack, and the cam is configured to drive the movable plate to move away from the gear rack.

2. The energy storing assistive mechanism of claim 1, wherein the gear rack comprises a plurality of first wedge-shaped teeth, each of the first wedge-shaped teeth comprises a first inclined surface and a first vertical surface opposite to each other, the first vertical surface is disposed facing the first pivot end, and the first inclined surface is disposed facing the second pivot end;
  the locking member comprises a plurality of second wedge-shaped teeth, each of the second wedge-shaped teeth comprises a second inclined surface and a second vertical surface opposite to each other, the second inclined surface is disposed facing the first pivot end, and the second vertical surface is disposed facing the second pivot end;
  when the locking member is engaged with the gear rack, the second inclined surfaces abut against corresponding ones of the first inclined surfaces, and the second vertical surfaces abut against corresponding ones of the first vertical surfaces.

3. The energy storing assistive mechanism of claim 1, wherein the elastic structure is a magnetic spring that comprises at least two magnets slidably received in the barrel, and each two adjacent ones of the at least two magnets have like poles that face each other.

4. The energy storing assistive mechanism of claim 1, wherein the rod comprises a flange at one end thereof, and the flange is configured to abut against an inner surface adjacent to the open end of the barrel to prevent the rod from disengaging from the barrel.

5. The energy storing assistive mechanism of claim 1, further comprising a linear hearing at the open end of the barrel, wherein the linear bearing is configured to support the rod.

6. The energy storing assistive mechanism of claim 1, wherein the actuator assembly comprises a linear actuator, the linear actuator is configured to drive the locking member to move toward and away from the gear rack.

7. The energy storing assistive mechanism of claim 1, further comprising a slidable limiting member fixed to the base, wherein the locking member defines a receiving chamber, the slidable limiting member is slidably received in the receiving chamber and configured to guide the locking member to slide with respect to the base.

8. The energy storing assistive mechanism of claim 1, wherein the rod defines a receiving hole extending along lengthwise direction thereof, and the gear rack is partly received in the receiving hole.

9. The energy storing assistive mechanism of claim 8, wherein the rod defines a through hole in an outer surface thereof, the through hole is in communication with the receiving hole, and one end of the locking member is received in the through hole.

10. The energy storing assistive mechanism of claim 1, further comprising a first base and a second base that are arranged apart from each other, wherein the first pivot end is rotatably connected to the first base, and the second pivot end is rotatably connected to the second base.

11. The energy storing assistive mechanism of claim 10, further comprising a first bearing rotatably connecting the first pivot end to the first base, and a second bearing rotatably connecting the second pivot end to the second base.

12. A robotic joint structure comprising:
a first link;
a second link rotatably connected to the first link;
an actuating member fixed to the first link and configured to drive the second link to rotate respect to the first link; and
an energy storing assistive mechanism comprising:
a barrel comprising a first pivot end and an opposite open end;
a rod comprising a first end that passes through the open end and is received in the barrel, the rod slidable with respect to the barrel along a lengthwise direction of the barrel;
an elastic structure comprising two ends that respectively abut against the first end of the rod and, the first pivot end of the barrel;
gear rack comprising a second pivot end away from the barrel;
a locking mechanism fixed to the rod, the locking mechanism comprising a locking member and an actuator assembly that is configured to drive the locking member to move between a first position where the locking member is engaged with the gear rack, and a second position where the locking member is disengaged from the gear rack, wherein the Rear rack is freely slidable with respect to the rod when the locking member is in the second position, and the gear rack is securely connected to the rod when the locking member is in the first position; and
a limiting plate fixed to the base;
wherein the locking mechanism further comprises a base that is fixed to the rod, and the locking member is slidably connected to the base;
wherein the actuator assembly comprises a rotating actuator, a cam driven by the rotating actuator, a movable plate fixed to the locking member and staying in contact with the cam, and an elastic member that is arranged between the limiting plate and the movable plate, the elastic member is configured to apply a pushing force to the movable plate so as to move the movable plate toward the gear rack, and the cam is configured to drive the movable plate to move away from the gear rack;
wherein the first pivot end is rotatably connected to the first link, and the second pivot end is rotatably connected to the second link.

13. A robot comprising:
an energy storing assistive mechanism comprising:
a barrel comprising a first pivot end and an opposite open end;
a rod comprising a first end that passes through the open end and is received in the barrel, the rod slidable with respect to the barrel along a lengthwise direction of the barrel;
an elastic structure comprising two ends that respectively abut against the first end of the rod and the first pivot end of the barrel;
a gear rack comprising a second pivot end away from the barrel;
a locking mechanism fixed to the rod, the locking mechanism comprising a locking member and an actuator assembly that is configured to drive the locking member to move between a first position where the locking member is engaged with the gear rack, and a second position where the locking member is disengaged from the gear rack, wherein the gear rack is freely slidable with respect to the rod when the locking member is in the second position, and the gear rack is securely connected to the rod when the locking member is in the first position; and a limiting plate fixed to the base;

wherein the locking mechanism further comprises a base that is fixed to the rod, and the locking member is slidably connected to the base;

wherein the actuator assembly comprises a rotating actuator, a cam driven by the rotating actuator, a movable plate fixed to the locking member and staving in contact with the cam, and an elastic member that is arranged between the limiting plate and the movable plate, the elastic member is configured to apply a pushing force to the movable plate so as to move the movable plate toward the gear rack, and the cam is configured to drive the movable plate to move away from the gear rack.

14. The robot of claim 13, wherein the gear rack comprises a plurality of first wedge-shaped teeth, each of the first wedge-shaped teeth comprises a first inclined surface and a first vertical surface opposite to each other, the first vertical surface is disposed facing the first pivot end, and the first inclined surface is disposed facing the second pivot end;

the locking member comprises a plurality of second wedge-shaped teeth, each of the second wedge-shaped teeth comprises a second inclined surface and a second vertical surface opposite to each other, the second inclined surface is disposed facing the first pivot end, and the second vertical surface is disposed facing the second pivot end;

when the locking member is engaged with the gear rack, the second inclined surfaces abut against corresponding ones of the first inclined surfaces, and the second vertical surfaces abut against corresponding ones of the first vertical surfaces.

15. The robot of claim 13, wherein the elastic structure is a magnetic spring that comprises at least two magnets slidably received in the barrel, and each two adjacent ones of the at least two magnets have like poles that face each other.

16. The robot of claim 13, wherein the rod comprises a flange at one end thereof, and the flange is configured to abut against an inner surface adjacent to the open end of the barrel to prevent the rod from disengaging from the barrel.

* * * * *